(12) United States Patent  
Sano et al.

(10) Patent No.: US 7,148,900 B2
(45) Date of Patent: Dec. 12, 2006

(54) CCM CALCULATING SYSTEM, CCM CALCULATING METHOD AND RECORDING MEDIUM

(75) Inventors: Kazuo Sano, Tokyo (JP); Fumiyoshi Saito, Tokyo (JP); Osamu Kobayashi, Tokyo (JP)

(73) Assignee: Danichisekia Color and Chemicals Mfg. Co., Ltd., Tokyo (JP)

( * ) Notice: Subject to any disclaimer, the term of this patent is extended or adjusted under 35 U.S.C. 154(b) by 0 days.

(21) Appl. No.: 09/879,958

(22) Filed: Jun. 14, 2001

(65) Prior Publication Data

US 2001/0052904 A1    Dec. 20, 2001

(30) Foreign Application Priority Data

Jun. 16, 2000    (JP) .......................... P2000-182032

(51) Int. Cl.
*G09G 5/02*    (2006.01)
(52) U.S. Cl. .................................... 345/589
(58) Field of Classification Search ............ 345/589, 345/590, 591, 593, 600
See application file for complete search history.

(56) References Cited

U.S. PATENT DOCUMENTS

| | | | |
|---|---|---|---|
| 3,722,109 A | | 3/1973 | Jacobson |
| 4,009,527 A * | | 3/1977 | Scott et al. ............... 434/98 |
| 4,813,000 A | | 3/1989 | Wyman et al. |
| 4,980,758 A * | | 12/1990 | Matsunawa et al. ........ 358/530 |
| 5,109,274 A * | | 4/1992 | Washio et al. .............. 358/518 |
| 5,254,977 A * | | 10/1993 | MacDonald ................ 345/591 |
| 5,311,212 A * | | 5/1994 | Beretta ..................... 345/591 |
| H1506 H | | 12/1995 | Beretta |
| 5,483,360 A * | | 1/1996 | Rolleston et al. .......... 358/518 |
| 5,543,940 A * | | 8/1996 | Sherman ................... 358/518 |
| 5,559,604 A * | | 9/1996 | Arai ........................ 356/402 |
| 5,590,251 A | | 12/1996 | Takagi |
| 5,668,633 A | | 9/1997 | Cheetam et al. |
| 5,774,238 A * | | 6/1998 | Tsukada .................... 358/529 |
| 5,963,201 A * | | 10/1999 | McGreggor et al. ......... 345/722 |

(Continued)

FOREIGN PATENT DOCUMENTS

CN    1155706 A    7/1997

(Continued)

OTHER PUBLICATIONS

Model and representation: the effect of visual feedback on human performance in a color picker interface Sarah A. Douglas, Arthur E. Kirkpatrick Apr. 1999 ACM Transactions on Graphics (TOG), vol. 18 Issue 2.*

(Continued)

*Primary Examiner*—Kee M. Tung
*Assistant Examiner*—J. Amini
(74) *Attorney, Agent, or Firm*—Oliff & Berridge, PLC

(57) ABSTRACT

The object of the invention is to provide a CCM calculating system being relatively inexpensive and alleviating the necessity of a spectrophotometer, a CCM calculating method and a recording medium. A CCM calculating system according to the invention calculates a blending ratio of colorants based on stored color data 16. The system has an input device 5(20*b*) for inputting data of color specification values corresponding to a desired target color; and a data operation unit 1(20*c*) for calculating a blending ratio of colorants for reproducing the target color, based on the input data of color specification values and stored color data. Since the blending ratio of colorants for reproducing the desired target color may be calculated based on the input color specification value data and stored color data, such CCM calculation may be performed without the necessity of a spectrophotometer.

24 Claims, 10 Drawing Sheets

U.S. PATENT DOCUMENTS

| | | | |
|---|---|---|---|
| 6,270,123 B1 * | 8/2001 | Spangler | 283/114 |
| 6,469,706 B1 * | 10/2002 | Syeda-Mahmood | 345/589 |
| 6,473,091 B1 * | 10/2002 | Iida et al. | 345/589 |
| 6,542,162 B1 * | 4/2003 | Hrusecky et al. | 345/629 |
| 6,549,653 B1 * | 4/2003 | Osawa et al. | 382/162 |
| 6,564,934 B1 * | 5/2003 | Dischler | 206/219 |
| 6,744,544 B1 * | 6/2004 | Nagashima et al. | 358/518 |
| 6,750,992 B1 * | 6/2004 | Holub | 358/504 |

FOREIGN PATENT DOCUMENTS

| | | |
|---|---|---|
| CN | 1207808 A | 2/1999 |
| EP | 0 791 892 A | 8/1997 |
| EP | 0 822 396 A | 2/1998 |
| EP | 1 089 554 A | 4/2001 |
| JP | 0653879 A | 5/1995 |
| JP | 96/00738 | 3/1996 |
| JP | A-050087 | 2/2000 |
| WO | 92 10791 A | 6/1992 |
| WO | 96/24033 | 8/1996 |

OTHER PUBLICATIONS

Do color models really make a difference? Sarah Douglas, Ted Kirkpatrick Apr. 1996 Proceedings of the SIGCHI conference on Human factors in computing systems: common ground.*

Accurate color reproduction for computer graphics applications Bruce J. Lindbloom Jul. 1989 ACM SIGGRAPH Computer Graphics, Proceedings of the 16th annual conference on Computer graphics and interactive techniques SIGGRAPH '89, vol. 23, issue 3.*

SamMatch: a flexible and efficient sampling-based image retrieval technique for large image databases Kien A. Hua, Khanh Vu, Jung-Hwan Oh Oct. 1999 Proceedings of the seventh ACM international conference on Multimedia (Part 1) Publisher: ACM Press.*

* cited by examiner

| No. | color1 | color2 | color3 | color4 | color5 | ΔE* | MI(C:A) | ΔH* | ΔC* |
|---|---|---|---|---|---|---|---|---|---|
| 1 | P-4050 0.2266 | P-4710 0.0041 | P-4490 0.5835 | P-4681 0.1858 | | 0.02 | 2.70 | 1.39 +--* | -2.31 *----+ |
| 2 | P-4050 0.8668 | P-4710 0.0211 | P-4477 0.0926 | P-4510 0.0194 | | 0.00 | 3.08 | 0.20 +* | 3.07 +----* |
| 3 | P-4050 0.9242 | P-4710 0.0213 | P-4446 0.0340 | P-4510 0.0204 | | 0.01 | 2.99 | 0.31 +* | 2.97 +----* |
| 4 | P-4050 0.8642 | P-4710 0.0209 | P-4477 0.0930 | P-4514 0.0219 | | 0.01 | 2.95 | 0.18 +* | 2.95 +----* |
| 5 | P-4050 0.8581 | P-4710 0.0194 | P-4485 0.1024 | P-4510 0.0201 | | 0.00 | 2.93 | 0.47 +* | 2.89 +----* |
| 6 | P-4050 0.2010 | P-4710 0.0020 | P-4490 0.6463 | P-4660 0.1508 | | 0.01 | 2.49 | 1.77 +---* | -1.75 *---+ |
| 7 | P-4050 0.8554 | P-4710 0.0192 | P-4485 0.1028 | EP- 4514 0.0227 | | 0.00 | 2.80 | 0.45 +* | 2.77 +----* |
| 8 | P-4050 0.6853 | P-4710 0.0112 | P-4410 0.0467 | P-4681 0.2568 | | 0.01 | 2.25 | 1.28 +--* | -1.85 *---+ |

(G )<--+-->(GY)    (small)<--+-->(large)

Fig. 6

CCM CALCULATING SYSTEM, CCM CALCULATING METHOD AND RECORDING MEDIUM

BACKGROUND OF THE INVENTION

1. Field of the Invention

The present invention relates to a CCM (computer color matching) system, for calculating a blending ratio of colorants for reproducing a desired target color, a CCM calculating method and a recording medium.

2. Related Art Statement

A prior CCM calculating system is of a stand-alone type, and comprises a spectrophotometer for measuring a color and a computer system, which stores a database of colorants and a program for calculating a blending ratio of the colorants. Such prior CCM calculating system calculates a blending ratio of colorants utilizing the database of colorants and the program for calculating a blending ratio, based on the colorimetric data measured by means of a spectrophotometer.

SUMMARY OF THE INVENTION

Although a spectrophotometer may provide calorimetric data of a flat sample at a high precision, it cannot provide calorimetric data of a sample with a curved surface or a very small sample. It is thus impossible to calculate a blending ratio of colorants due to the lack of the calorimetric data. Alternatively, it is not necessarily indispensable to obtain accurate calorimetric data by means of a spectrophotometer so that a sample color may be strictly reproduced with a high precision, for example in a design step of a printing process. Further, a CCM calculating system of a stand-alone type is very expensive.

The present invention has been made for solving the above problems and its object is to provide a CCM calculating system being relatively inexpensive and alleviating the necessity of a spectrophotometer, a CCM calculating method and a recording medium.

According to the present invention described in claim 1, a CCM calculating system for calculating a blending ratio of colorants based on stored color data, the system includes: an input unit for inputting data of color specification values corresponding to a desired target color; and a calculating unit for calculating a blending ratio of colorants for reproducing the target color based on the input data of color specification values and the stored color data.

According to the thus constructed CCM calculating system for calculating a blending ratio of colorants based on stored color data, data of color specification values corresponding to a desired target color is inputted by an input unit; and a blending ratio of colorants for reproducing the target color is calculated by a calculating unit based on the input data of color specification values and the stored color data.

According to the present invention described in claim 2, the CCM calculating system as claimed in claim 1 includes a server storing the color data, wherein the calculating unit calculates the blending ratio using the server.

According to the present invention described in claim 3, the CCM calculating system as claimed in claim 1, further includes a color specification value displaying unit for displaying color specification values included in the input data of color specification values.

According to the present invention described in claim 4, the CCM calculating system as claimed in claim 1, further includes a correcting unit for correcting the color specification values displayed on the displaying unit.

The present invention described in claim 5, is the CCM calculating system as claimed in claim 1, wherein the color data includes data of color chips, colorants, resins or applications.

According to the present invention described in claim 6, the CCM calculating system as claimed in claim 1, further includes blending ratio displaying unit for displaying the calculated blending ratio of colorants.

The present invention described in claim 7, is the CCM calculating system as claimed in claim 6, wherein the color data includes data of costs of colorants, the calculating unit provides a plurality of the blending ratios of colorants and calculates the total cost of each of the calculated blending ratios based on the data of costs of colorants, and the blending ratio displaying unit displays the plurality of blending ratios arranged in the descending order or the ascending order in terms of the total cost.

The present invention described in claim 8, is the CCM calculating system as claimed in claim 1, wherein first difference of hues, lightnesses or chromas of the target color and a test sample for toning with one light irradiated is different from second difference of hues, lightnesses or chromas of the target color and the test sample with another light irradiated, and wherein the system further includes unit for calculating the blending ratio of colorants which may effectively decrease the difference between the first difference and the second difference.

The present invention described in claim 9, is the CCM calculating system as claimed in claim 1, wherein the color data is provided based on data obtained by the measurement by unit of a spectrophotometer.

The present invention described in claim 10, is the CCM calculating system as claimed in claim 1, wherein the color data is provided based on data obtained by the measurement by unit of a colorimeter.

The present invention described in claim 11, is a CCM calculating method for calculating a blending ratio of colorants based on stored color data, the method including the steps of: inputting data of color specification values corresponding to a desired target color; and calculating a blending ratio of colorants for reproducing the target color based on the input data of color specification values and the stored color data.

The present invention described in claim 12, is a computer-readable medium having a program of instructions for execution by the computer to perform a CCM calculation processing for providing a blending ratio of colorants based on stored color data, the CCM calculation processing including the steps of: inputting data of color specification values corresponding to a desired target color; and calculating a blending ratio of colorants for reproducing the target color based on the input data of color specification values and the stored color data.

BRIEF DESCRIPTION OF THE DRAWINGS

FIG. 6 shows a table of an example of a list of calculated blending ratios of colorants.

DESCRIPTION OF THE PREFERRED EMBODIMENTS

There will be described embodiments of the present invention with reference to the drawings.

Figure 1:
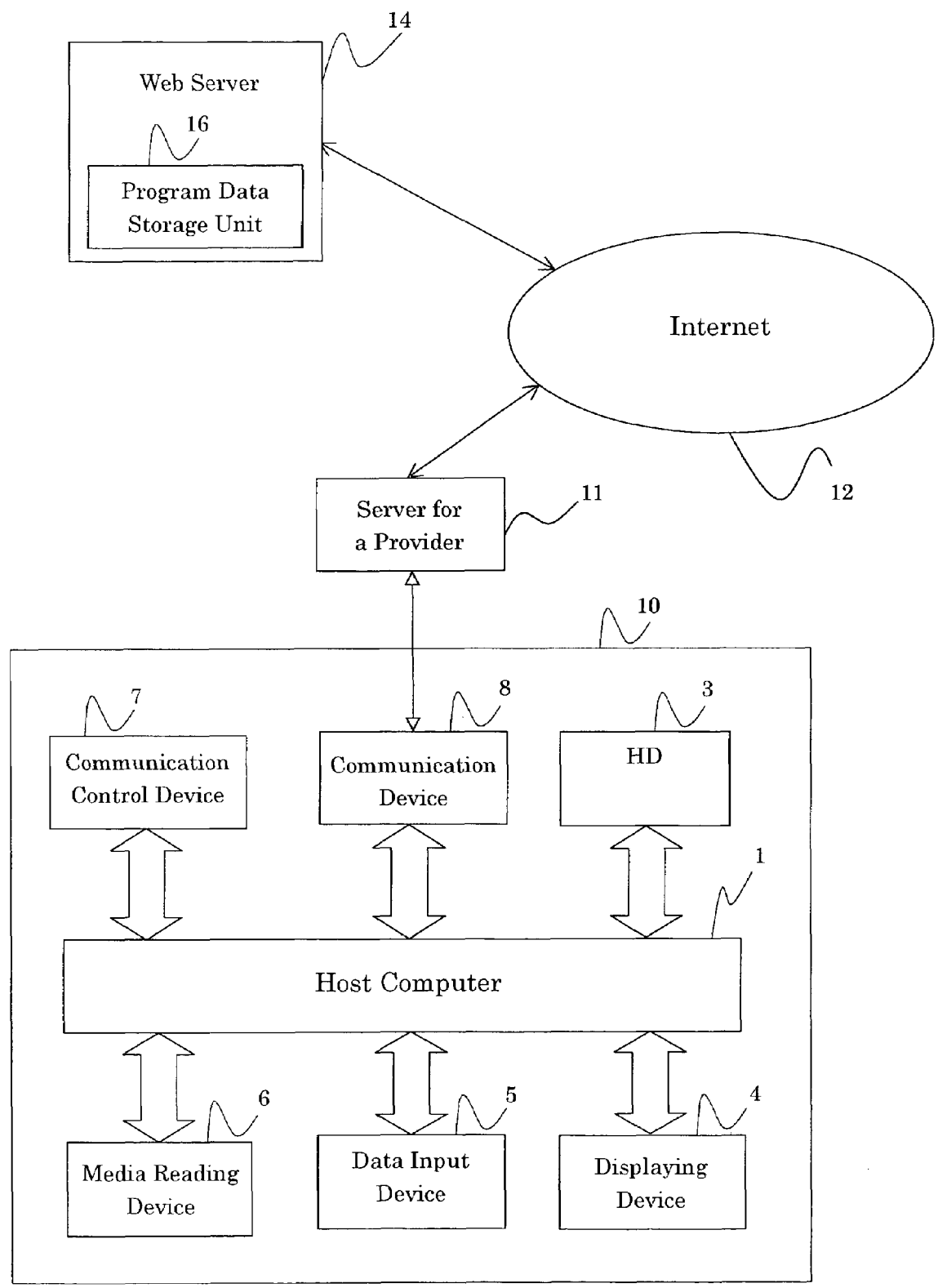
FIG. 1 is a block diagram showing a concrete hardware construction of a CCM system according to one embodiment of the present invention.

FIG. 1 is a block diagram showing a concrete hardware construction of a CCM calculating system according to an embodiment of the present invention. As shown in FIG. 1, a client 10 is connected with an internet (world wide web) 12 through a server 11 for a provider, and a web server 14 is connected with the internet 12. That is, the client 10 and web server 14 are connected with each other through the internet.

A host computer 1 executes a program, and regulates and monitors the execution of the program by means of a predetermined system program. For example, the computer has a CPU (Central Processing Unit) mounted on a system board, RAM (Random Access Memory), ROM (Read Only Memory) and a hard disk HD of an interior or exterior type. The computer is designed so that the CPU appropriately reads a desired program from the HD 3 and executes a desired process utilizing the program.

Moreover, the host computer 1 has a display device 4 with a monitoring screen, a data input device 5 for inputting various kinds of specified information, and a reading device 6 for reading a media including a CD-ROM drive and FDD. The computer 1 further has a communicating device which communicates with another system through a network and has a modem, a terminal adapter or a network card, and a communication control device 7 for controlling the communication device 8. The data input device 5 is composed of a pointing device such as a keyboard, a mouse or the like. The web server 14 has a program data storing unit 16 storing a CCM calculating program and databases of colorants and color chips or the like. Alternatively, a computer of a stand-alone type having a hard disk and a main body may be used. In this case, the CCM calculating program and the databases of colorants and color chips may be stored in the hard disk, so that the program and databases may be read out from the disk to the main body for execution, when the computer is activated. Alternatively, it is possible to store a CCM calculating program and databases of the colorants and color chips or the like in a medium such as CD-ROM or a floppy disk. The media reading device 6 may read out the program and databases for the installation into the hard disk 3. Each of these media thus constitutes a medium recording the CCM calculating program. The CCM calculating program itself also falls within the scope of the present invention.

Figure 2:
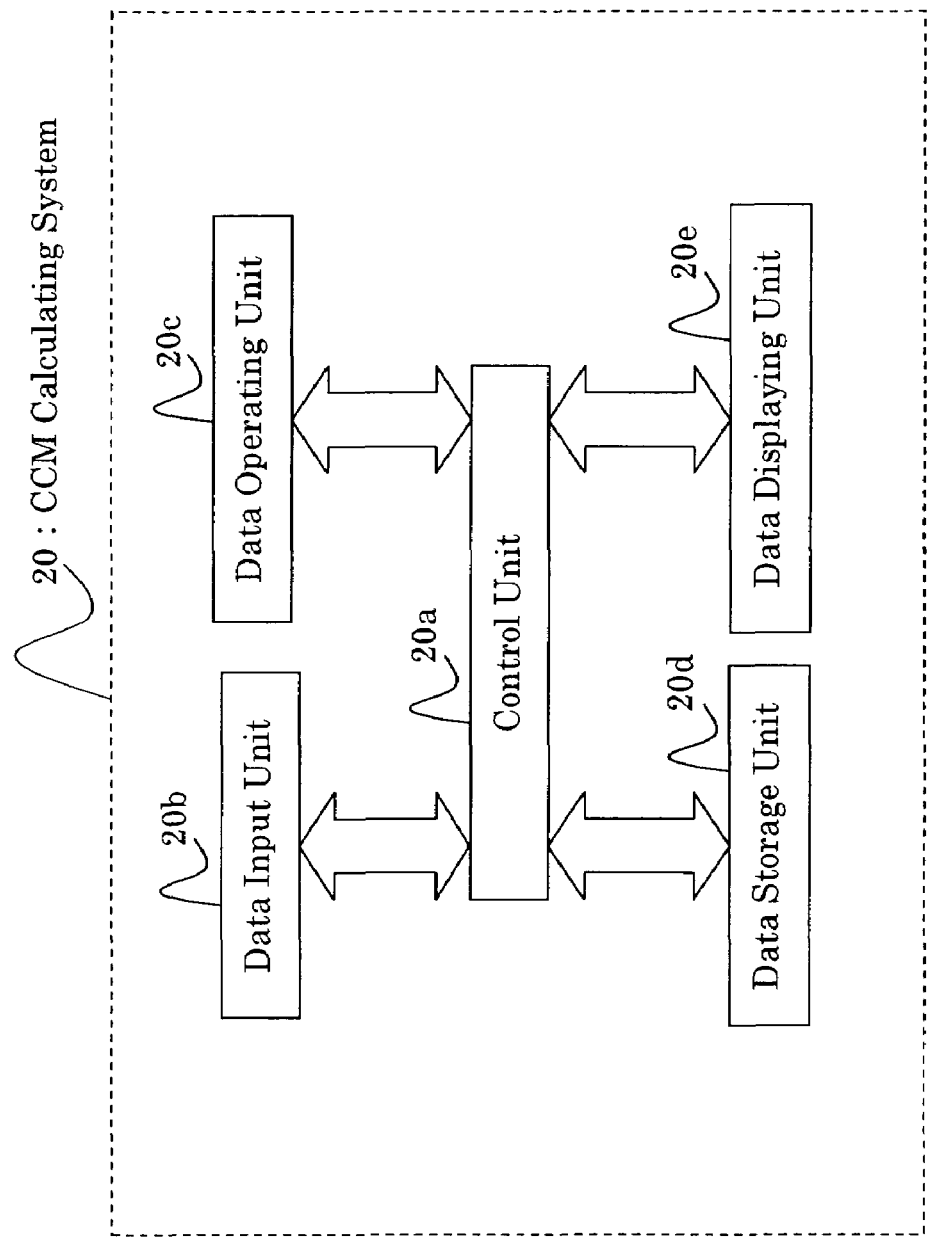
FIG. 2 is a functional block diagram of a CCM system according to one embodiment of the present invention.

FIG. 2 shows a functional block diagram of a CCM calculating system 20 for executing a CCM calculating program according to the present invention. The CCM calculating system 20 of the invention has a data input unit 20b for inputting various kinds of data, a data storage unit 20d for storing data of colorants etc., and a data operating unit 20c for executing data operation based on the input data and stored data. The system 20 further has a data display unit 20e for displaying the results of the operation and data of colorants or the like, and a control unit 20a. The unit 20a regulates the processing in the data input unit 20b, data storage unit 20d, data operating unit 20c and data display unit 20e.

(CCM Calculating Process)

Next, a CCM calculating process performed by executing a CCM calculating program, according to one embodiment of the invention, will be described referring to FIG. 3.

First, a user accesses a program data storage unit 16 (step 21) within the web server 14 by using the data input device 5 of the client 10 through the server 11 for a provider and internet 12. The program data storage unit stores the CCM calculating program and databases of colorants and color chips or the like. When the access is successfully performed, the monitoring screen of the displaying device 4 displays a list of names and reference numbers of a group of color chips (step 22).

The user then inputs a reference number of a color chip (for example, a color chip selected from a standard color atlas for paints) whose color is similar to a desired target color to be reproduced, by means of the data input device 5 (step 24). A screen is then displayed on the display device for specifying the differences of color specification values with respect to the color specification values of the color chip having the input reference number (step 26). The differences may be input on the screen. Besides, each color specification value and spectral reflectance (or spectral transmittance), corresponding to each reference number of each color chip, are stored in the program data storage unit 16 in advance. Therefore, tristimulus values X, Y and Z may be calculated based on the input (in advance) color specification values, corresponding with the visually evaluated color similar to the target color.

Figure 3:
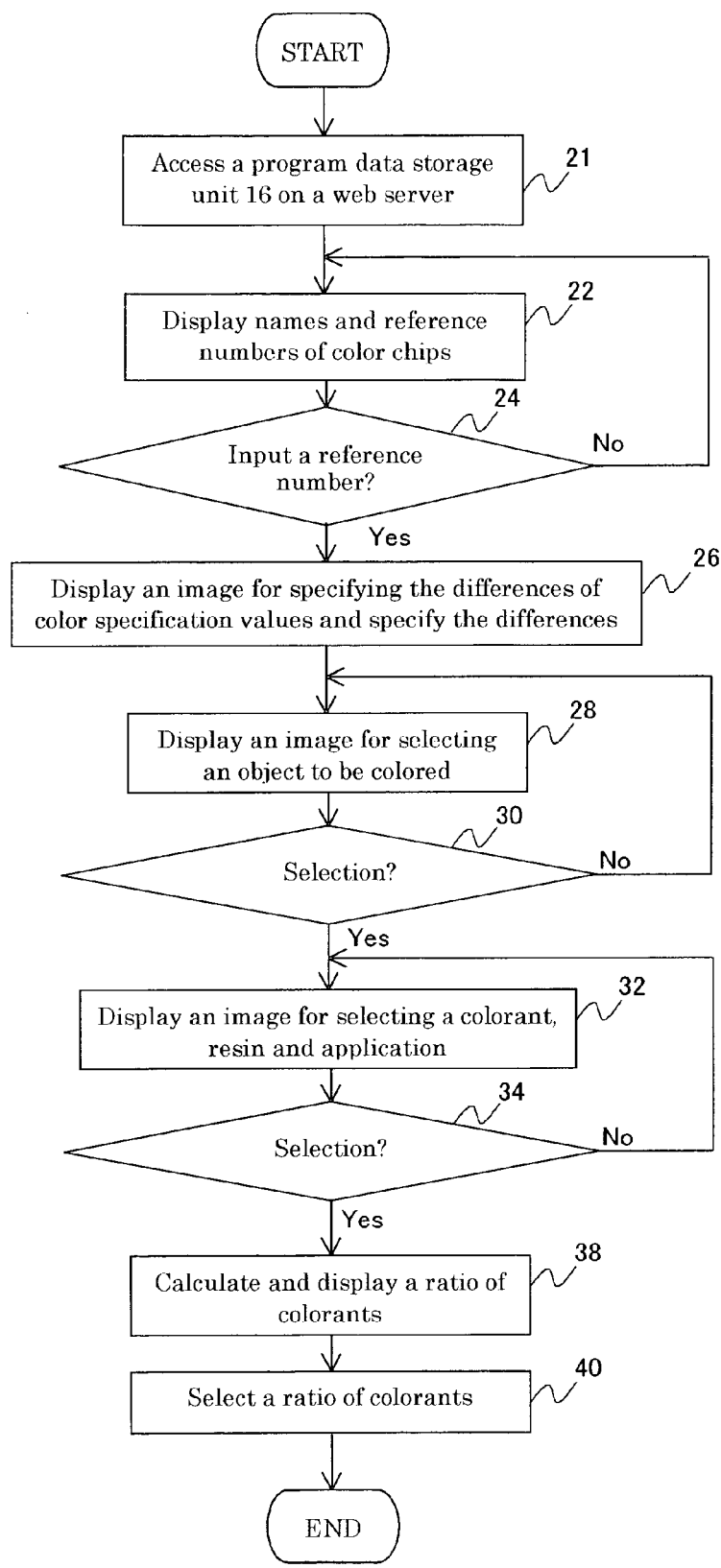
FIG. 3 shows a flow chart for describing a CCM calculation process according to one embodiment of the invention.

Alternatively, color specification values (for example, specification values of Munsell system etc.) may be directly input, without inputting the reference number of a color chip and the differences of color specification values as in the steps 22 to 26 shown in FIG. 3.

Figure 5:
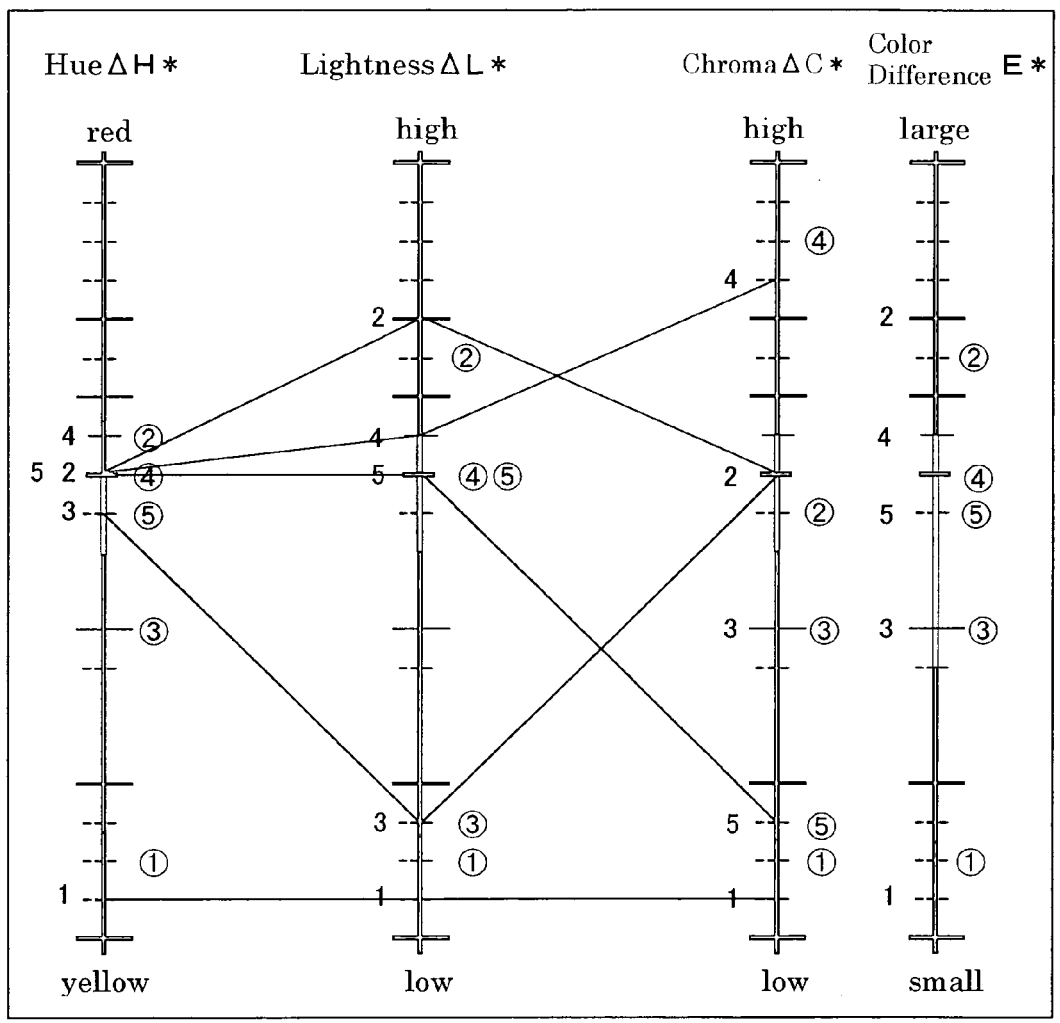
FIG. 5 is a diagram schematically showing a screen for specifying the differences of color specification values.
Figure 5:
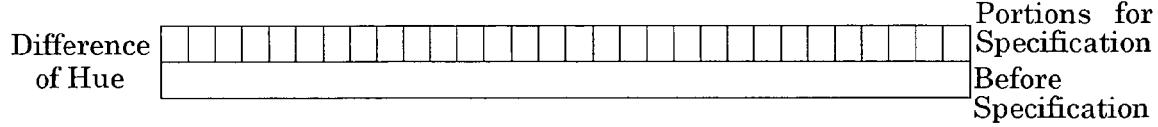
Figure 5:
Figure 5:
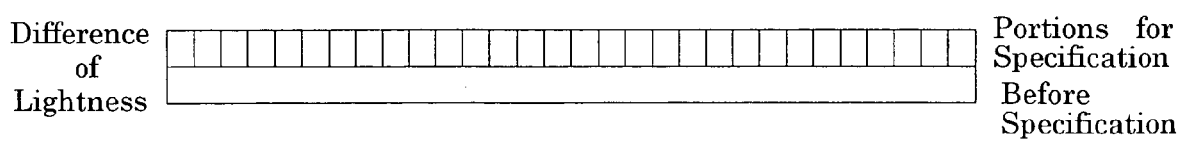

FIG. 5 shows one example of a screen for specifying the differences of color specification values. As shown in FIG. 5, color samples may be arranged in descending or ascending order of a hue, chroma or lightness for selecting a color chip with desired hue, chroma or lightness. More specifically, scales indicating the differences $\Delta H^*$, $\Delta L^*$, $\Delta C^*$ of a hue, lightness and chroma are shown in the screen of FIG. 5. A desired point may be selected on each scale for specifying each of the differences of hue, lightness and chroma, by the click of a mouse on the desired point. Further, three sets (arrays) of color sample display portions are arranged in descending or ascending order of hue, chroma and lightness, respectively. A desired color sample display portion may be selected for specifying each of the differences of hue, lightness and chroma, by the click of a mouse on the desired display portion in each array. The client can choose either of the methods described above.

Although the scales of a hue $\Delta H^*$, lightness $\Delta L^*$ and chroma $\Delta C^*$ are shown in the screen of FIG. 5, any color specification system may be applied as far as it may be converted to tristimulus values XYZ. Such color specification system includes Munsel color system (HVC) and L*a*b*.

In the embodiment where color specification values (for example, specification values of Munsell color system) are directly input, color specification values corresponding to each Munsell color chip are input in advance. Tristimulus values XYZ corresponding to each Munsell color chip may be calculated by converting the color specification values input in advance. Sometimes specified (input) specification values of Munsell color system do not match with any of the specification values of Munsell color system input in advance and the specification values of Munsell color system corresponding to the adjacent (surrounding) Munsell color chips. In this case, tristimulus values XYZ which correspond to the directly input specification values of Munsell system may be calculated by interpolation based on the specification values of Munsell system (input in advance) corresponding to the adjacent Munsell color chips.

Next, a screen for selecting an object to be colored is displayed on the display device 4 (step 28). In the present embodiment, "plastic (opaque)", "plastic (transparent)", "an object for a paint" or "an object for printing" are to be displayed as an object to be colored.

When each of the objects to be colored is then selected (step 30, "Yes"), desired data are read out from the program data storage unit 16, "colorant", "resin" and "application" corresponding to the selected object to be colored are displayed on the displaying device 4 (step 32).

In the present embodiment, when "plastic (opaque)" is selected,
"Colorants for PVC resins",
"Colorants for PS-ABS resins",
"Colorants for PE-PP resins",
"Colorants for epoxy resins",
"Colorants for urethane resins" etc. are to be displayed as "colorant", and
"High quality",
"Medium quality",
"Low quality",
"Electric Cables" etc. are to be displayed as "application".
Further, when "plastic (transparent)" is selected,
"Colorants for PVC resins",
"Colorants for PS resins",
"Colorants for PC resins" etc. are to be displayed as "Colorant", and
"High quality",
"Medium quality",
"Low quality" etc. are to be displayed as "application".
Further, when "an object for a paint" is selected,
"Air drying paint",
"Water bone paint",
"Baking enamel paint",
"Urethane Paint" etc. are to be displayed as "Colorants", and
"High quality",
"Medium quality",
"Low quality", etc. are to be displayed as (applications).
When "an object for a paint" is selected, "resin" is not displayed.

Further, when "an object for printing" is selected,
"For offset-board",
"For offset-thin paper",
"For Web offset",
"For gravure-water based-PET-first side",
"For gravure-water based-PET-verso",
"For gravure-water based-PP-first side",
"For gravure-water based-PP-verso",
"For gravure-solvent based-PET-first side" etc. are to be displayed as "colorant", and
"High quality",
"Medium quality", and
"Low quality" are to be displayed.

After "colorant", "resin" and "application" are selected (step 34), desired data are read out from the program data storage unit 16 to calculate a blending ratio of colorants, corresponding with the selected "colorant", "resin" and "application", which is then displayed (step 38).

Next, methods for calculating the blending ratio of colorants in the step 38 will be described.

(1) In the case of "an object for printing"

The equation of Kubelka-Munk is represented as the following equation (1).

$$K/S = (1-R)^2/2R \quad (1)$$

The reverse development of the equation (1) provides the following equation (2).

$$R = 1 + (K/S) - ((K/S)^2 + 2(K/S))^{1/2} \quad (2)$$

In the equations, R is a spectral reflectance of an object, K is an absorption coefficient of an object, and S is a scattering coefficient.

In the case of "an object for printing" (single constant method), a specified amount of each colorant (for example, ink) is weighed and used to color an object. The spectral reflectance of the colored object is measured for calculating and recording (K/S) of the colorant in advance. Fn of the colorant as a function of the K/S is also recorded. Fn is represented by the following equation (3).

$$Fn = ((K/S)n - (K/S)_0)/Cn \quad (3)$$

In the equation, (K/S)n is a K/S value of a colored print calculated according to the equation (1) and spectral reflectance of a colorant, and $(K/S)_0$ is a K/S value of an object (for example, a paper) to be colored. Further, Cn is a weight in terms of weight percent of a colorant, Fn is a characteristic K/S value of a colored print per an unit weight percent of a colorant, and n is name of a colorant. An object colored with a mixture of a plurality of colorants has a (K/S)mix value calculated according to the following equation (4).

$$(K/S)\text{mix} = F_1 C_1 + \ldots + F n C n + (K/S)_0 \quad (4)$$

Since simulations of blending ratios of test samples for toning are known, Cn shown in the equation (4) is known. Fn and $(K/S)_0$ are recorded in a CCM calculation system in advance. (K/S)mix of a test sample may be therefore calculated. (K/S)mix value may be substituted in the (K/S) item in the equation (2) to obtain a spectral reflectance according to a CCM simulation (RPR).

(2) In the case of "a plastic (opaque)" and "an object for a paint"

In the case of "a plastic (opaque)" and "an object for a paint" (double constant method), the Duncan's equation (5)

$$(K/S)\text{mix} = (K_1 C_1 + \ldots + K n C n + K_0)/(S_1 C_1 + \ldots + S n C n + S_0) \quad (5)$$

is applied for calculating (K/S)mix for a mixture of colorants. In the equation, Kn is an absorption coefficient, Sn is a scattering coefficient, and Cn is an amount in terms of weight percent of each colored object. Further, $K_0$ is an absorption coefficient of an object to be colored (for example, a resin etc.), and $S_0$ is its scattering coefficient. The equation (5) may be represented as the following equation (6), provided that one of the mixed colorants, such as titanium dioxide, is specified as a reference "a" and the scattering coefficients of the other colorants are represented as relative values with respect to that of the reference "a"

$$(K/S)\text{mix}=\{\Sigma(K_n/S_n)(S_n/S_a)C_n+(K_0/S_0)(S_0/S_a)\}/\{\Sigma(S_n/S_a)C_n+S_0/S_a\} \quad (6)$$

In the equation (6), Kn/Sn is a K/S value according to the equation (1) and each measured spectral reflectance of each colored object. $K_0/S_0$ is a K/S value according to the equation (1) and the measured spectral reflectance of an object to be colored (for example, a resin etc.). Further, Sn/Sa is a relative scattering coefficient of each colored object with respect to that of the reference "a", and $S_0/Sa$ is a relative scattering coefficient of an object to be colored with respect to that of the reference. These values are recorded in a CCM calculating system in advance. Since simulations of blending ratios of test samples for toning are known, Cn in the equation (6) is known. Further, the other values are recorded in a CCM calculating system in advance as described above so that the (K/S)mix value of a test sample may be calculated. The thus obtained (K/S)mix value is substituted in the item (K/S) in the equation (2) to obtain a spectral reflectance according to a CCM simulation (RPR).

(3) In the case of "a plastic (transparent)"

When an object is transparent, the following theoretical equation (7) of Lambert-Beer is applied.

$$D=-\text{Log } T \quad (7)$$

A specified amount of each colorant is weighed and used for coloring an object. The spectral transmittance of each colored object is measured to calculate each D function of each colorant (that is, Dn) according to the equation (7), which is then recorded. Dn is represented by the following equation (8).

$$D_n=(-\text{Log } T_n+\text{Log } T_0)/C_n \quad (8)$$

In the equation, Tn is a spectral transmittance of an object colored with each colorant alone, $T_0$ is a spectral transmittance of an object to be colored (for example, a resin), and Cn is an amount of a colorant in terms of weight percent. Dn is thus a characteristic D value of each colorant per an unit weight percent of a colorant, and n is name of a colorant.

A "D" value of an object colored with a mixture of a plurality of colorants is calculated according to the following equation (9).

$$D\text{mix}=D_1C_1+\ldots+D_nC_n+D_0 \quad (9)$$

Since simulations of blending of test samples are known, Cn in the equation (9) is known. Dn is also recorded in a CCM calculating system in advance so that Dmix of a test sample may be calculated. The thus obtained Dmix value is then substituted in the item "D" in the equation (7) to obtain a spectral transmittance according to a CCM simulation (TPR).

The single and double constant methods according to Kubelka-Munk and Lambert-Beer's method are CCM simulation techniques, and are examples of procedures for calculating a spectral reflectance according to a CCM simulation (RPR) and a spectral transmittance according to a CCM simulation (TPR).

Corrected amounts with respect to any blending ratio Cn of colorants for approaching a target color may be calculated according to the following three partial differential equations (10).

$$\Delta X=\Sigma \partial X/\partial C_n \cdot \Delta C_n$$

$$\Delta Y=\Sigma \partial Y/\partial C_n \cdot \Delta C_n$$

$$\Delta Z=\Sigma \partial Z/\partial C_n \cdot \Delta C_n \quad (10)$$

In the equations, $\Delta X$, $\Delta Y$ and $\Delta Z$ are the differences of tristimulus values of a target color and a simulated color corresponding to a blending ratio on the road of convergent calculation, $\partial C_n \cdot \Delta C_n$, $\partial Y/\partial C_n$ and $\partial Z/\partial C$ n are variations of the tristimulus values per a single unit of a colorant, and $\Delta C_n$ is a corrected amount of a colorant. Each corrected amount of each colorant may be calculated from the above matrix (10).

As described above, an appropriate theoretical equation may be determined according to the selection of an object to be colored on the step 30.

A first set of the tristimulus values XYZ is thus calculated based on the input reference number corresponding to a color chip and the specified differences of color specification values as described above. A second set of the tristimulus values XYZ is calculated from the specified color specification values (CCM simulation). The first and second sets of the tristimulus values are substituted in the equations (10) and subjected to looping. A blending ratio of colorants Cn is obtained, when the $\Delta X$, $\Delta Y$ and $\Delta Z$ in the equations (10) are permissible, and displayed on the display device 4 (step 38). One example of a list of the thus calculated blending ratios of colorants are shown in FIG. 6.

In FIG. 6, each of Nos. 1 to 8 shows each blending ratio of colorants 1 to 4. A colorant 1 is white, a colorant 2 is black, and colorants 3 and 4 are chromatic colors. Further, $\Delta E$ indicates color differences, and MI (C:A) indicates metamerism indexes (C: natural light/A: tungsten light). The data of colorants may include the cost of each colorant to calculate each total cost corresponding to each blending ratio of colorants. The blending ratios of colorants may be arranged in the ascending order or the descending order in terms of the corresponding total cost, in FIG. 6.

Then, the following two methods may be applied.

(Method 1)

The hues, lightnesses and chromas of a target color and a test sample for toning under natural light are different from each other, respectively (first difference: difference under natural light). The hues, lightnesses and chromas of a target color and a test sample for toning under test light (for example, tungsten light) are also different from each other, respectively (second difference: difference under test light). There are deviations (differences) between the first differences and second differences of the hues ($\Delta H$), lightnesses ($\Delta L$) and chromas ($\Delta C$). A user may select a certain blending ratio of colorants for effectively canceling (reducing or decreasing) the differences between the first differences and second differences for hues $\Delta H$, lightnesses ($\Delta L$) and chromas $\Delta C$.

(Method 2)

Further, in another embodiment, a user may compare (visually evaluate) a target color and color chips and then carry out fine visual evaluation between the target color and selected color chip under a main light source (for example, natural light). Such visual evaluation may be performed by selecting the (first) differences of color specification values (typically by the clicks using a mouse on desired points on graphs (scales) showing the differences of hues, lightnesses and chromas, as shown in FIG. 5). The user further specifies the (second) differences of color specification values between the target color and the selected color chip under (another) test light source (normally tungsten light) based on visual evaluation. There is a difference between the first difference of each color specification value under main light source and second difference thereof under another light source. A CCM program may calculate a blending ratio of colorants for effectively decreasing (canceling) the differences of the first differences under the main light source and the second differences under another light source. The thus calculated blending ratio may be displayed in the ascending order in terms of metamerism indexes between the target color and CCM simulation.

A user then select a desired blending ratio among the blending ratios displayed in the step 38 (step 40) and terminates the entire process. The selected blending ratio is stored in the program data storage unit 16.

Further, in the present embodiment, the differences of hues, lightnesses and chromas between a target color and color chip are input for calculating a blending ratio of colorants in the step 26. Instead of this, the blending ratio of colorants may be input to calculate the differences of hues, lightnesses and chromas.

(Confirmation Process of a CCM Simulation Blending)

Figure 10:
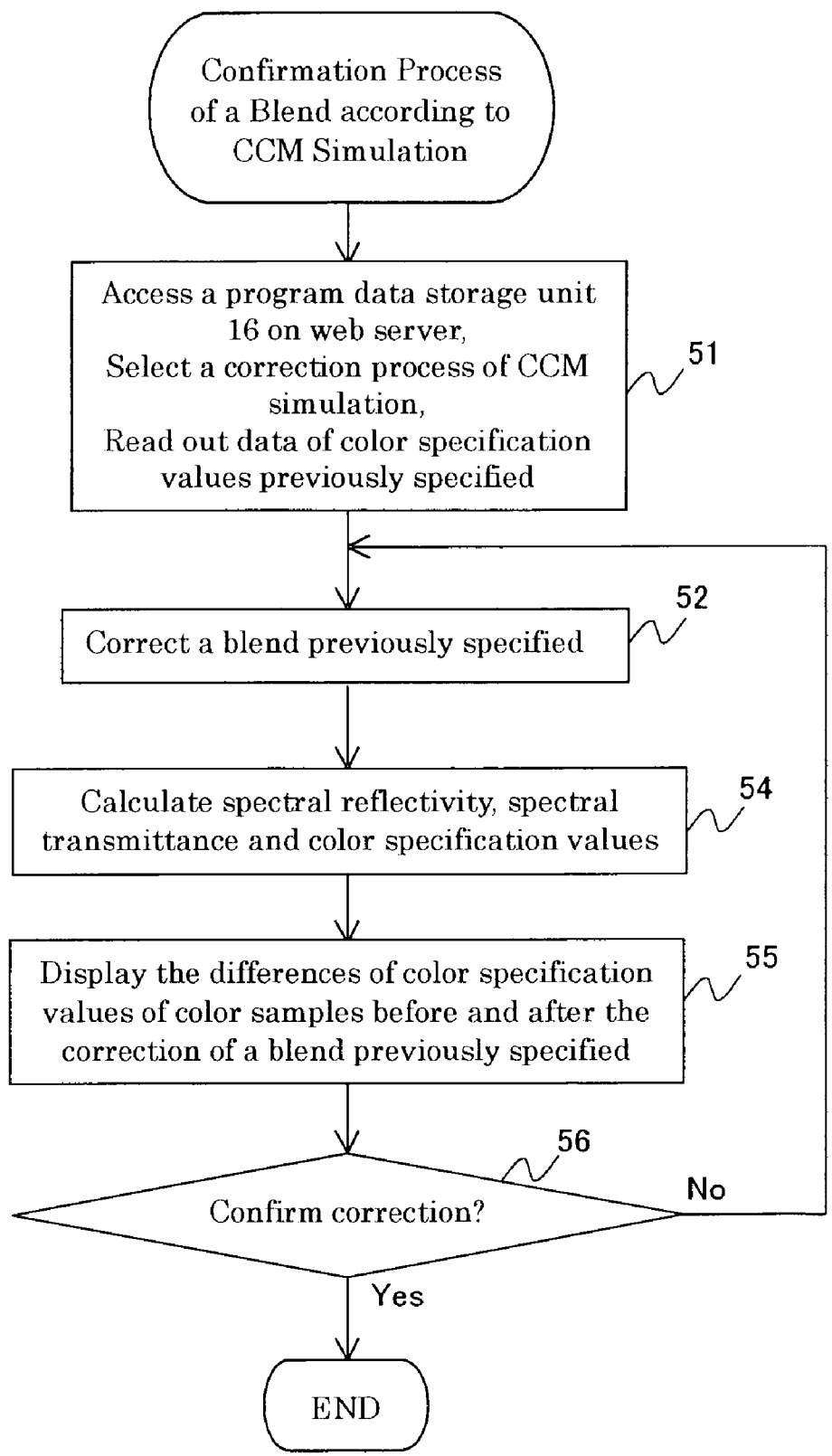
FIG. 10 is a flow chart for explaining a process of calculating the differences of hues, lightnesses and chromas based on a blending ratio of colorants input by a user, and displaying the differences.

Next, a process for inputting a blending ratio of colorants to calculate the differences of hues, lightnesses and chromas and displaying the results, referring to FIG. 10.

First, a user accesses a program data storage unit 16 using a data input device 5 of a client 10 through a server 11 for a provider and world wide web (internet) 12. The program data storage unit 16 is within a web server 14 and stores a CCM calculating program and a database of colorants or the like. The user then selects a confirmation process of a blending ratio according to a CCM simulation. Specified data of color specification values, corresponding to the blending ratio of colorants selected in the step 40, are read out from the program data storage unit 16 (step 51).

Next, the user corrects the blending ratio displayed on the screen and sends a confirmation of the correction to the server 14 (step 52).

The server 14 then calculates the spectral reflectance or spectral transmittance corresponding to the corrected blending ratio according to a CCM simulation using the above equation (4) or (6) or (9) to obtain the corrected color specification values (step 54). Next, each difference of each of the three color specification values between the blending ratios before and after the correction is displayed on the screen shown in FIG. 5 for the user (client) (step 55). The client can confirm the color effects of the corrected blending ratio specified by the client as the differences of color specification values. When the client wants to correct the blending ratio again (when the user selects "No" in step 56), the process goes back to the step 52. When the client finally confirms the corrected blending ratio (when the user selects "Yes" in the step 56), the process is terminated.

(Calculating Method of a Metamerism Index)

Figure 7:
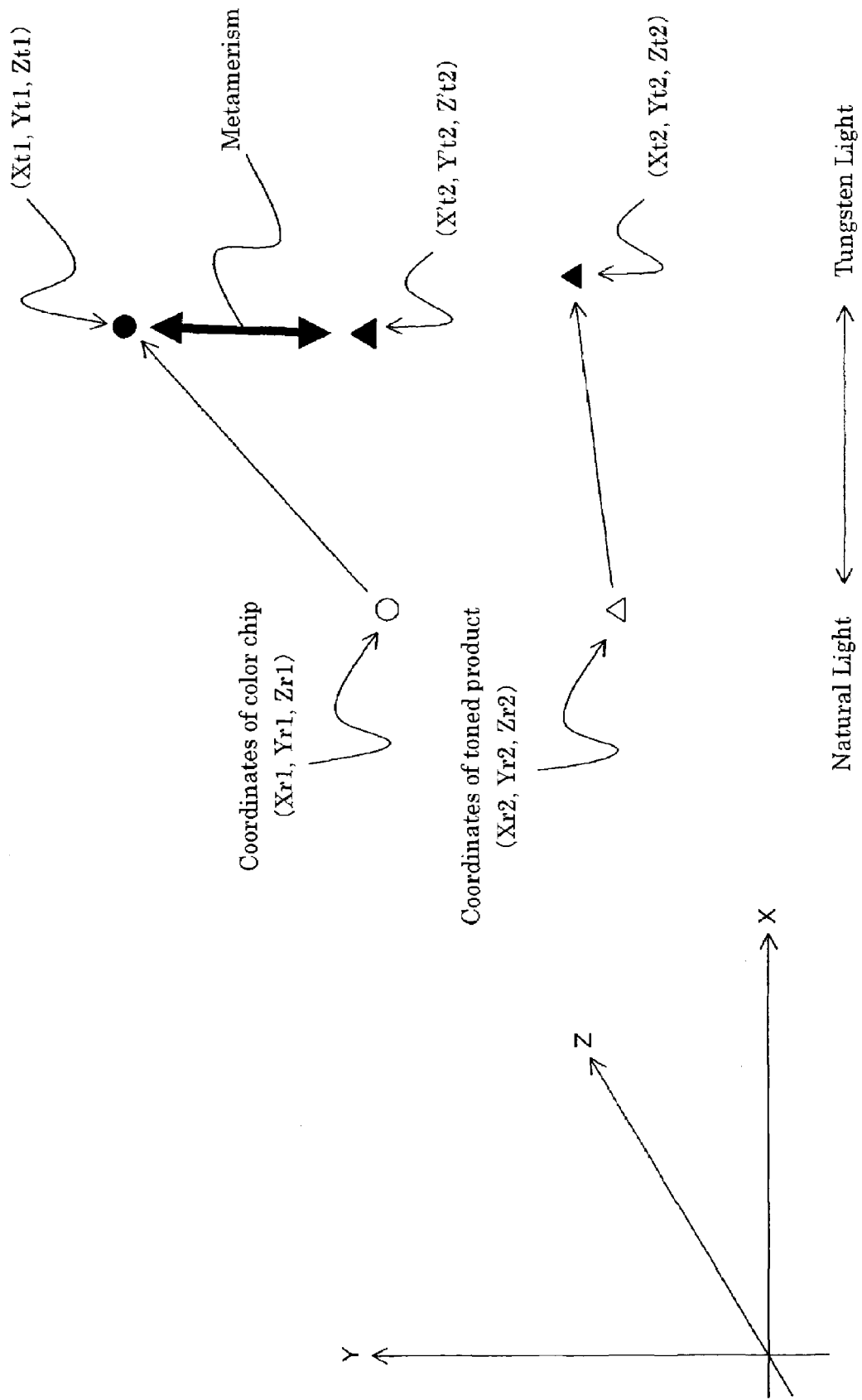
FIG. 7 is a conceptual diagram for generally explaining a metamerism index.

Next, how to calculate a metamerism index will be described. At first, a method for calculating a metamerism index between a color sample and test sample will be described as a general example, referring to FIG. 7, which shows a XYZ color space (represented according to tristimulus values). In the space, (Xr1, Yr1, Zr1) are coordinates of a color sample and (Xr2, Yr2, Zr2) are coordinates of a test sample, respectively, under a reference light (normally natural light). (Xt1, Yt1, Zt1) are coordinates of a color sample and (Xt2, Yt2, Zt2) are coordinates of a test sample, respectively, under a test light (normally tungsten light). When the test sample is not completely matched with the color sample (When (Xr1, Yr1, Zr1) are different from (Xr2, Yr2, Zr2)), the corrected coordinates of the test sample (X't2, Y't2, Z't2) are applied for calculating a metamerism index. (X't2, Y't2, Z't2) are calculated according to the following equations (11).

$$X't2 = Xt2 \cdot Xr1/Xr2$$

$$Y't2 = Yt2 \cdot Yr1/Yr2$$

$$Z't2 = Zt2 \cdot Zr1/Zr2 \tag{11}$$

The metamerism between the color sample and test sample is defined as a color difference of them under a test light. It is thus defined as a distance between a point with coordinates (Xt1, Yt1, Zt1) of the color sample and a point with corrected coordinates (X't2, Y't2, Z't2) of the test sample under tungsten light. That is, the metamerism index may be represented as the color difference between the two points.

(Method 1)

A method 1 for calculating the metamerism index will be described, referring to FIG. 8.

(Xr1, Yr1, Zr1) are coordinates of a selected color chip under main light and (Xt1, Yt1, Zt1) are coordinates of the color chip under test light. The spectral reflectances (or spectral transmittances) of each color chip (sample) is measured and stored in advance. The spectral distributions of main light and test light sources, as well as a color matching function corresponding to the sensitivity of human eyes, are also stored in advance. (Xr1, Yr1, Zr1) and (Xt1, Yt1, Zt1) may be calculated based on the spectral reflectances (or spectral transmittances) of each color chip.

The client compares the target color with the selected color chip under main light and inputs the differences of the color specification values as described above. When the client specifies and inputs the differences of color specification values under main light, the input values are converted to certain coordinates (X'r1, Y'r1, Z'r1). More specifically, the coordinates (Xr1, Yr1, Zr1) of the color chip are converted to color specification values of L*H*C* system, which is then added to the differences of the color specification values input and specified by the client (for example, ΔL*, ΔH*, ΔC*). The sums of the color specification values of L*H*C* system are then converted to tristimulus values XYZ to obtain the corrected coordinates (X'r1, Y'r1, Z'r1) under main light. The spectral reflectance or transmittance on the corrected coordinates (X'r1, Y'r1, Z'r1) under main light is unknown.

The corrected coordinates (X't1, Y't1, Z't1) under test light may be calculated according to the following equations (12).

$$X't1 = Xt1 \cdot X'r1/Xr1$$

$$Y't1 = Yt1 \cdot Y'r1/Yr1$$

$$Z't1 = Zt1 \cdot Z'r1/Zr1 \tag{12}$$

The corrected coordinates (X't1, Y't1, Z't1) are calculated so that a metamerism index between the coordinates (Xt1, Yt1, Zt1) of the color chip and the corrected coordinates (X't1, Y't1, Z't1) is zero.

The client then performs a CCM simulation as follows. The CCM system stores each scattering coefficient and/or absorption coefficient of each colorant on each wavelength in advance. The CCM system utilizes these data of colorants and a CCM calculation program to calculate and provide combinations of colorants (together with the blending ratio of the colorants) corresponding to the corrected coordinates (X'r1, Y'r1, Z'r1). There are a plurality of combinations of colorants and the blending ratios satisfying the tristimulus values (X'r1, Y'r1, Z'r1). One of the blends of colorants are selected so as to reduce the metamerism index, as follows.

The spectral reflectance of each of the thus obtained blending ratios of colorants is then calculated by performing a simulation using a CCM calculation program.

The thus obtained spectral reflectance, corresponding to each blend of colorants, the spectral distributions of the main and test light sources, and the color matching function are then used to calculate CCM simulation coordinates (Xt2, Yt2, Zt2) under the test light. Spectral transmittance may be used instead of spectral reflectance. A plurality of the CCM simulation coordinates (Xr2, Yr2, Zr2) under main light and (Xt2, Yt2, Zt2) under test light are obtained. Each combination of the CCM simulation coordinates under main and test light sources corresponds with each blend of colorants.

Thus the corrected coordinates (X'r1, Y'r1, Z'r1) and (X't1, Y't1, Z't1) and the coordinates (Xr2, Yr2, Zr2) and (Xt2, Yt2, Zt2) according to a CCM simulation are obtained, corresponding with one set of input (selection) of color specification values by the client. The input (selection) of color specification values is carried out based on the visual evaluation between the target color and the color chip under main light.

Figure 8:
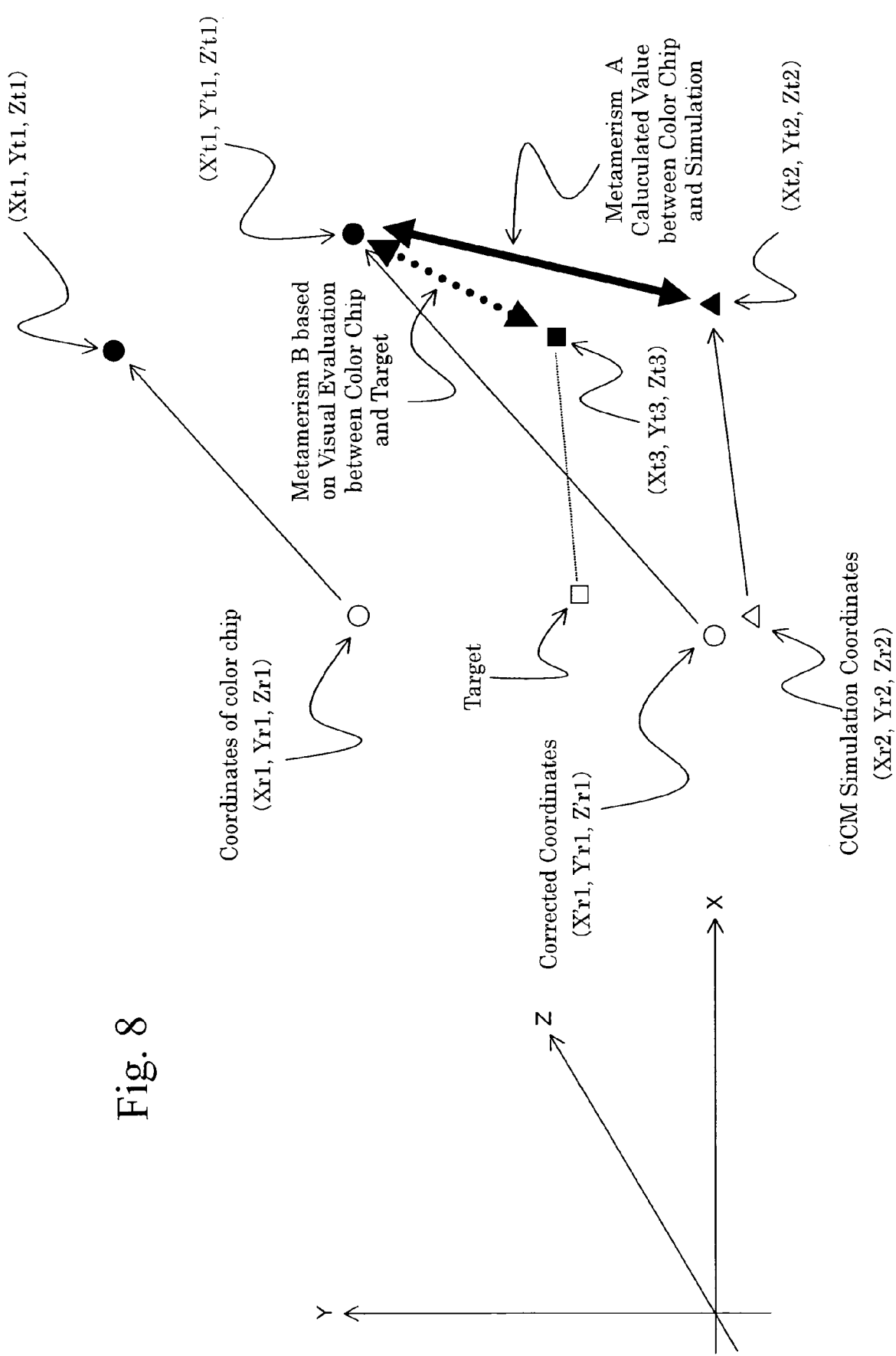
FIG. 8 is a conceptual diagram for explaining "method 1" of calculating a metamerism index.

A metamerism "A" shown in FIG. 8 is a metamerism index (distance) between the corrected coordinates (X't1, Y't1, Z't1) and the CCM simulation coordinates (Xt2, Y2t, Zt2). A distance between (Xt2, Yt2, Zt2) and (X't1, Y't1, Z't1) may be deemed as a metamerism "A" between the color chip and the results of a CCM simulation. The client obtains a plurality of the metamerisms "A" each corresponding with each blend of colorants at this stage.

A metamerism "B" shown in FIG. 8 is a metamerism between the color chip and target color under test light based on visual evaluation.

The client then selects the most appropriate blend of colorants for reducing the difference between the metamerism "A" and "B". Such selection method is not particularly limited and includes the following selection methods.

The client visually evaluates and compares the color chip and target color under the test light so as to perform a visual evaluation of the metamerism "B" between the color chip and target color.

The differences of hues ΔH, lightnesses ΔL and chromas ΔC corresponding with a plurality of metamerisms "A" are displayed on a screen.

The client then selects one metamerism "A" among a plurality of the metamerisms "A" displayed on the screen, based on the visual evaluation of the metamerism "B". In other words, the client selects one set of the differences of hues ΔH, lightnesses ΔL and chromas ΔC on the screen corresponding with one metamerism "A".

The selection of one metamerism "A" is carried out based on the above visual evaluation, so that the difference between the metamerism "A" and metamerism "B" is sufficiently small or practically negligible. Therefore one selected blend of colorants, corresponding to the selected metamerism "A", is finally presented as a solution.

When the client compares the metamerisms "A" and "B", the metamerisms may preferably be selected in the forms of the differences of hues ΔH*, lightnesses ΔL* and chromas ΔC* for the convenience of the comparison.

(Method 2)

A method 2 for calculating a metamerism index and selecting an appropriate blend of colorants will be described, referring to FIG. 9.

The corrected coordinates (X't1, Y't1, Z't1) may be obtained as described above in "method 1" section. The CCM simulation coordinates (Xr2, Yr2, Zr2) and (Xt2, Yt2, Zt2) are calculated according a CCM simulation as described in "method 1" section. A plurality of metamerisms "A", each corresponding to each blend of colorants, may also be obtained as described above.

Figure 9:
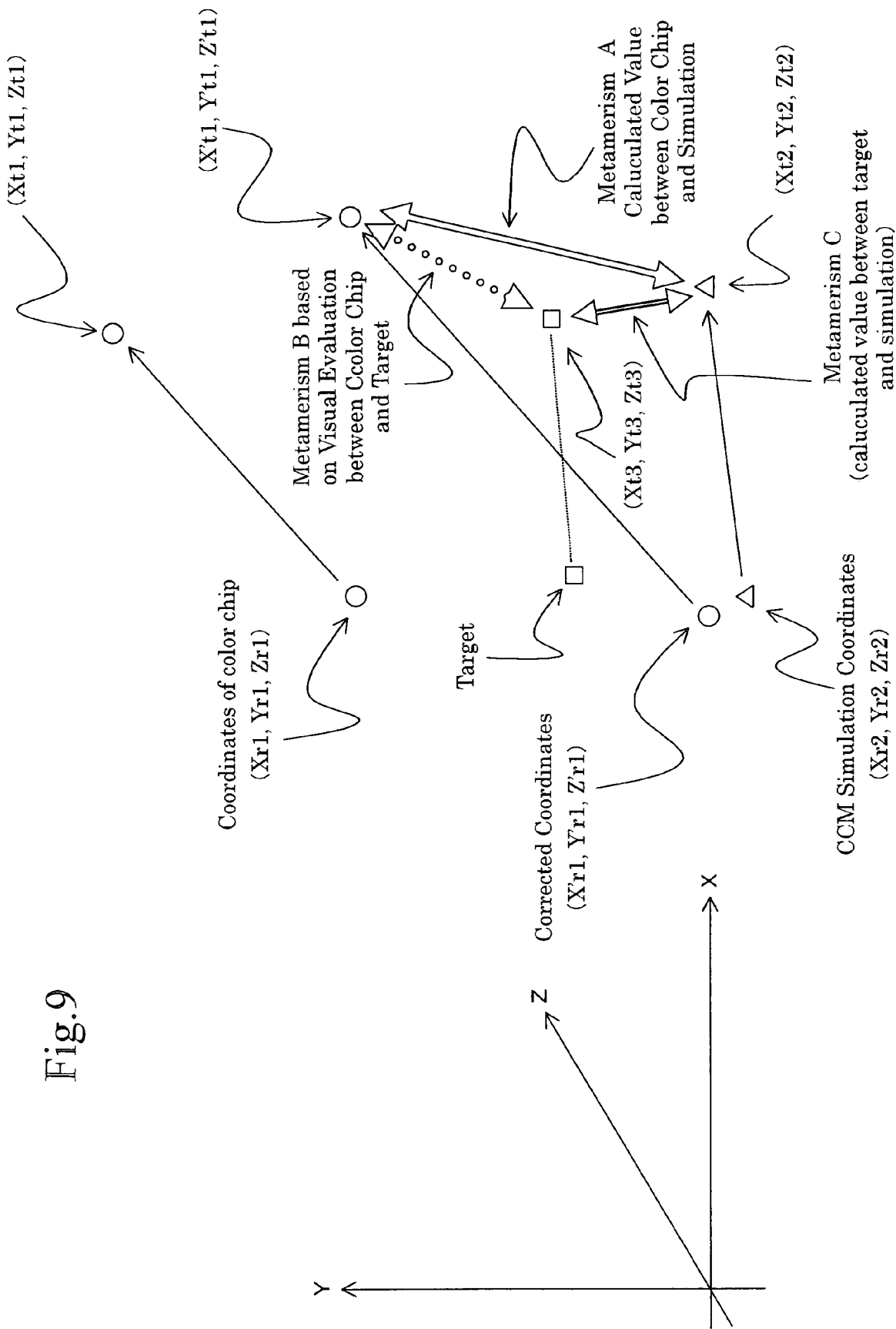
FIG. 9 is a conceptual diagram for explaining "method 2" of calculating a metamerism index.

A metamerism "B" shown in FIG. 9 is a metamerism between the color chip and target color based on visual evaluation. The client visually evaluates and compares the color chip and target color under the test light so as to perform visual evaluation of the metamerism "B". The client then inputs or specifies the results of the visual evaluation of the metamerism "B", by specifying the differences of color specification values (for example, hue ΔH*, lightness ΔL* and chroma ΔC*). The color specification values specified and input by the client are added to color specification values converted from (X't1, Y't1, Z't1) to obtain color specification values corresponding with the corrected coordinates (X'r1, Y'r1, Z'r1). The resultant color specification values are then converted to tristimulus values (Xt3, Yt3, Zt3) corresponding to the target color under the test light.

A metamerism "C" is defined as a metamerism index between the coordinates of tristimulus values (Xt3, Yt3, Zt3) and (Xt2, Yt2, Zt2). In other words, the metamerism index "C" is a color difference calculated from the tristimulus values (Xt3, Yt3, Zt3) and (Xt2, Yt2, Zt2). Each color difference (metamerism index "C") may be calculated corresponding to each blending ratio of colorants.

A plurality of metamerism indexes "C" are obtained for final evaluation. When a plurality of ratios of colorants are arranged in a list on a screen shown in a display device, the ratios of colorants may be arranged in the ascending order in terms of the color difference. The client can select an appropriate ratio of colorants with a sufficiently small or negligible metamerism index on the screen.

Alternatively, a client may visually evaluate and compare the color chip and target color under test light and specify (input) the differences of the color specification values. The coordinates of tristimulus values (Xt1, Yt1, Zt1) of the color chip under the test light is converted to the corresponding color specification values, which are then added to the specified differences of color specification values (input by the client) to obtain resultant color specification values. The resultant values are converted to tristimulus values (Xt3, Yt3, Zt3), which correspond with the target color under test light. The metamerism "C" may be calculated as the color difference between the thus obtained tristimulus values (Xt3, Yt3, Zt3) and (Xt2, Yt2, Zt2).

Next, a method for calculating the coordinates (X'r1, Y'r1, Z'r1) described in the above sections of (method 1) and (method 2) will be described. The coordinates (X'r1, Y'r1, Z'r1) are calculated based on the coordinates (Xr1, Yr1, Zr1) of a color chip under main light and the differences of color specification values specified (input) by the client. In the following description, L*C*H* color specification system is applied as one example. Where ΔL*, ΔC* and ΔH* represent the differences of color specification values specified (input)

by the client, L*, C* and H* represent color specification values calculated from the coordinates of a color chip (Xr1, Yr1, Zr1), and Lr1*, Cr1* and Hr1* represent color specification values of a target color, the following equations apply.

$$Lr1^* = L^* + \Delta L^*$$

$$Cr1^* = C^* + \Delta C^*$$

$$Hr1^* = H^* + \Delta H^*$$

That is, the calculation of tristimulus values of a target color includes conversion of coordinates from L*C*H* color specification system to XYZ color specification system. In other words, the calculation of coordinates of XYZ color specification system of a target color includes the conversion of coordinates according to L*C*H* color specification system (specified by a client) to coordinates according to the XYZ system. When a client specifies coordinates (three components) of the three differences of color specification values according to any color specification system, such coordinates may be converted to the XYZ color specification system.

(Correction Process According to a CCM Calculation)

Figure 4:
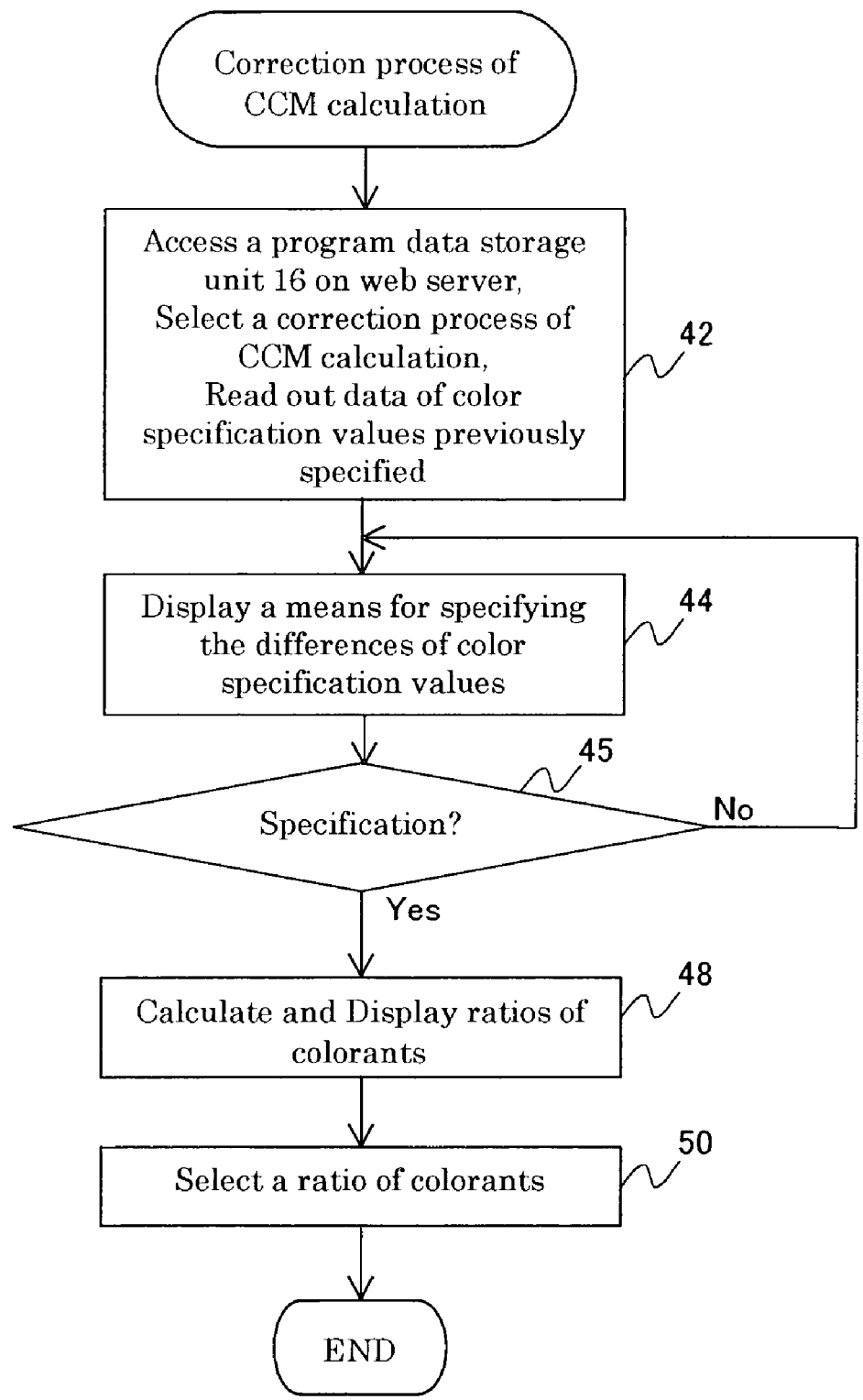
FIG. 4 is a flow chart for describing a correction process of CCM calculation according to one embodiment of the invention.

Next, a correction process according to CCM calculation performed by the execution of a CCM calculation program, according to one embodiment of the invention, will be described referring to FIG. 4.

First, a user accesses a program data storage unit within a web server 14 by using a data input device 5 of a client 10 through a server 11 for a provider and internet 12. The program data storage unit stores a CCM calculating program and databases of colorants and color chips or the like. When the access is successfully performed, the user selects "correction process according to a CCM calculation". The data of the specified color specification values, selected in the step 40 as described above, corresponding to each ratio of colorants are read out from the program data storage unit 16 (step 42).

Next, a screen for specifying the differences of color specification values as shown in FIG. 5 is displayed on the displaying device 4. Scales of the differences of a hue, lightness and chroma are shown in FIG. 5. Each of the color specification values corresponding with the previously calculated ratios of colorants is indicated on each scale as a reference (zero point). A color display unit 4 displays three arrays of color sample display portions. Each color sample portion in each array is displayed based on RGB values calculated from the specified differences of hues ΔH*, lightness ΔL* and chroma ΔC*. The color sample portions are arranged in each array in the descending or ascending order of hue, chroma or lightness. The user specifies the differences of hue ΔH*, lightness ΔL* and chroma ΔC* by the click using a mouse on each desired point on each scale, and confirms the color displayed on the color display unit 4. A desired color sample display portion may be selected for specifying each of the differences of hue, lightness and chroma, by the click of a mouse on the desired display portion in each array. The client can select either of both methods described above.

Scales (graphs) of the differences of hue ΔH*, lightness ΔL* and chroma ΔC* are used in FIG. 5. Alternatively, any color specification system, such as specification values of Munsell color system (HVC), L*a*b* or the like, may be applied, as far as coordinates belonging to such system may be converted to tristimulus values XYZ.

When the differences of color specification values are specified (step 45, Yes), the steps 38 and 40 are repeated as described above (steps 48 and 50).

A CCM calculating system described in claim 1 calculates a blending ratio of colorants for reproducing a desired target color based on input data of color specification values and stored color data, thereby enabling CCM calculation without the necessity of a spectrophotometer.

What is claimed is:

1. A CCM calculating system for calculating a blending ratio of colorants based on stored color data including data of color chips and data of colorants, and for presenting information of said blending ratio to a user, said system comprising:

a data receiving means for receiving data identifying a color chip selected by a user and data of differences of color specification values between color specification values corresponding to the selected color chip and color specification values corresponding to a desired target color;

a calculating means for calculating a target blending ratio of colorants for reproducing said desired target color based on said data of colorants and data of said color specification values corresponding to said desired target color; and a means for supplying data of said calculated target blending ratio to be presented to a user;

wherein said differences color specification values are specified by a user based on an image in a display and a visual perception of a color of said selected color chip and said desired target color.

2. The CCM calculating system as claimed in claim 1, comprising a server storing said stored color data, wherein said calculating means calculates said target blending ratio using said server.

3. The CCM calculating system as claimed in claim 1, further comprising a color specification value displaying means for displaying said differences of color specification values included in said received data.

4. The CCM calculating system as claimed in claim 3, further comprising a correcting means for correcting said differences of color specification values displayed on said displaying means.

5. The CCM calculating system as claimed in claim 1, further comprising blending ratio displaying means for displaying said calculated target blending ratio of colorants.

6. The CCM calculating system as claimed in claim 5, wherein said color data includes data of costs of colorants, said calculating means provides a plurality of said calculated target blending ratios of colorants and calculates a total cost of each of calculated target blending ratios of colorants based on said data of costs of colorants, and said blending ratio displaying means displays said plurality of calculated target blending ratios arranged in a descending order or an ascending order in terms of said total cost.

7. The CCM calculating system as claimed in claim 1, wherein a first difference of hues, lightness or chromas of said desired target color and a test sample for toning with one light irradiated is different from a second difference of hues, lightness or chromas of said desired target color and said test sample with another light irradiated, and wherein said system further comprises means for calculating a plurality of calculated target blending ratios of colorants which may decrease a difference between first difference and said second difference.

8. The CCM calculating system as claimed in claim 1, wherein said stored color data is provided based on data obtained by a measurement using a spectrophotometer.

9. The CCM calculating system as claimed in claim 1, wherein said stored color data is provided based on data obtained by a measurement using a colorimeter.

10. The CCM calculating system of claim 1, wherein said image includes scales for specifying said differences of color specification values.

11. The CCM calculating system of claim 1, wherein said image includes portions for colors arranged in a descending or an ascending order of said differences of color specification values.

12. A CCM calculating method for calculating a blending ratio of colorants based on stored color data including data of color chips and data of colorants and for presenting information of said blending ratio to a user, said method comprising the steps of:

receiving input data identifying a color chip selected by a user and data of differences of color specification values between color specification values corresponding to the selected color chip and color specification values corresponding to a desired target color; and calculating a target blending ratio of colorants for reproducing said desired target color based on said data of colorants and data of said color specification values corresponding to said desired target color; and supplying data of said calculated target blending ratio to be presented to a user, wherein said differences of color specification values between color specification values are specified by a user based on an image in a display and a visual perception of a color of said selected color chip and said desired target color.

13. The method of claim 12, wherein said calculated target blending ratio is calculated using a server storing said stored color data.

14. The method of claim 12, further comprising the step of displaying differences of color specification values included in said input data using an input data displaying means.

15. The method of claim 14, further comprising the step of correcting said differences of color specification values being displayed on said input data displaying means.

16. The method of claim 12, wherein said stored color data includes data of colorants, resins or applications.

17. The method of claim 12, further comprising the step of displaying said calculated target blending ratio of colorants in a blending ratio displaying means.

18. The method of claim 17, wherein said color data includes data of costs of colorants, a plurality of said calculated target blending ratios of colorants are provided and a total cost of each of said calculated target blending ratios of colorants is calculated based on said data of costs of colorants, and said blending ratio displaying means displays said plurality of calculated target blending ratios arranged in a descending order or an ascending order in terms of said total cost.

19. The method of claim 18, wherein a first difference of hues, lightness or chroma of said desired target color and a test sample for toning with one light irradiated is different from a second difference of hues, lightness or chroma of said desired target color and said test sample with another light irradiated, and wherein said calculated target blending ratios of colorants are calculated which may decrease a difference between said first difference and said second difference.

20. The method of claims 19, wherein said stored color data is provided based on data obtained by a measurement using a spectrophotometer.

21. The method of claim 19, wherein said stored color data is provided based on data obtained by a measurement using a colormeter.

22. The method of claim 12, wherein said image includes scales for specifying said differences of said color specification values.

23. The method of claim 12, wherein said image includes portions for colors arranged in a descending or an ascending order of said differences of color specification values.

24. A computer-readable medium having a program of instructions for execution by a computer to perform a CCM calculation processing for providing a blending ratio of colorants based on stored color data including data of color chips and data of colorants and for presenting information of said blending ratio to a user, said CCM calculation processing comprising the steps of:

receiving data identifying a color chip selected by a user and data of differences between color specification values corresponding to the selected color chip and color specification values corresponding to a desired target color; and calculating a target blending ratio of colorants for reproducing said desired target color based on said data of colorants and data of said color specification values corresponding to said desired target color; and supplying data of said calculated target blending ratio to be presented to a user, wherein said differences between color specification values are specified by a user based on an image in a display and a visual perception of a color of said selected color chip and said desired target color.

* * * * *

UNITED STATES PATENT AND TRADEMARK OFFICE
CERTIFICATE OF CORRECTION

PATENT NO. : 7,148,900 B2  Page 1 of 1
APPLICATION NO. : 09/879958
DATED : December 12, 2006
INVENTOR(S) : Kazuo Sano, Fumiyoshi Saito and Osamu Kobayashi It is certified that error appears in the above-identified patent and that said Letters Patent is hereby corrected as shown below:

Please delete the following:

(73)   Assignee:       Danichisekia Color and Chemicals Mfg. Co., Ltd., Tokyo (JP)

and Replace with:

(73)   Assignee:       Dainichiseikia Color and Chemicals Mfg. Co., Ltd., Tokyo (JP)

Signed and Sealed this

Twenty-seventh Day of March, 2007

JON W. DUDAS
*Director of the United States Patent and Trademark Office*